US007006876B2

(12) United States Patent  
Ross

(10) Patent No.: US 7,006,876 B2
(45) Date of Patent: Feb. 28, 2006

(54) SAFETY CABINET WITH SIMPLIFIED OPERABILITY

(75) Inventor: Gerd Ross, Frankfurt (DE)

(73) Assignee: Kendro Laboratory Products GmbH, Hanau (DE)

( * ) Notice: Subject to any disclaimer, the term of this patent is extended or adjusted under 35 U.S.C. 154(b) by 185 days.

(21) Appl. No.: 10/419,147

(22) Filed: Apr. 21, 2003

(65) Prior Publication Data

US 2003/0197450 A1 Oct. 23, 2003

(30) Foreign Application Priority Data

Apr. 22, 2002 (DE) .................................. 102 17 903

(51) Int. Cl.
G05B 11/01 (2006.01)
(52) U.S. Cl. ..................... 700/12; 700/17; 700/83; 700/13; 700/15; 702/188; 702/189; 250/551; 250/239; 70/78; 70/277; 70/288; 312/209; 312/319.5; 312/223.6
(58) Field of Classification Search ............ 700/12–15, 700/19, 83, 17; 221/9, 31, 251, 254; 702/188, 702/189; 250/221, 214 R, 239, 551; 463/25; 70/78, 277, 288; 340/825.29, 5.61, 5.64; 312/319.5, 209, 223.6
See application file for complete search history.

(56) References Cited

U.S. PATENT DOCUMENTS 3,995,899 A * 12/1976 Tippy et al. ............... 292/254
4,360,796 A * 11/1982 Shocknesse ................ 340/932
4,831,562 A *  5/1989 McIntosh et al. ........... 702/177
5,047,948 A *  9/1991 Turner ....................... 700/237
5,212,359 A *  5/1993 Morganti ................. 200/61.69
5,291,191 A *  3/1994 Moore ....................... 340/5.91
5,441,165 A *  8/1995 Kemp et al. ................. 221/2
5,568,963 A * 10/1996 Bennett et al. ............ 353/122
5,583,741 A * 12/1996 Dosmo et al. .............. 361/600
5,589,089 A * 12/1996 Uesugi .................... 219/121.6
5,598,332 A *  1/1997 Wakabayashi ............... 705/24
5,805,456 A *  9/1998 Higham et al. ............. 700/236
5,912,621 A *  6/1999 Schmidt .................... 340/571
5,924,079 A *  7/1999 Brown ....................... 705/16
6,039,467 A *  3/2000 Holmes ...................... 221/2
6,175,779 B1 *  1/2001 Barrett ...................... 700/242
6,310,783 B1 * 10/2001 Winch et al. .............. 361/797
6,374,649 B1 *  4/2002 Holcomb et al. ............ 70/78
6,622,887 B1 *  9/2003 Roediger .................... 221/3
6,663,488 B1 * 12/2003 Adams ...................... 463/17
6,775,591 B1 *  8/2004 Shoenfeld .................. 700/243
6,778,868 B1 *  8/2004 Imamura et al. ............ 700/79
2003/0227238 A1 * 12/2003 Gluck et al. ............... 312/209

* cited by examiner

*Primary Examiner*—Ramesh Patel
(74) *Attorney, Agent, or Firm*—Baker & Hostetler LLP

(57) ABSTRACT

The invention pertains to a safety cabinet with an interior that is enclosed by a housing and a housing front side with a work opening that can be closed with a height-adjustable window. The safety cabinet contains an operating unit for controlling device functions which is integrated into the housing. The operating unit comprises at least one rocker button, the button assignment of which changes depending on the operating state of the safety cabinet in such a way that a certain device function can be controlled in the respective operating state by actuating a button of the rocker button.

13 Claims, 3 Drawing Sheets

SAFETY CABINET WITH SIMPLIFIED OPERABILITY

FIELD OF THE INVENTION

The invention pertains to a safety cabinet, the device functions of which can be controlled in a particularly simple fashion.

BACKGROUND OF THE INVENTION

Conventional microbiological safety cabinets are usually provided with an integrated operating unit that is mounted on the outer side of the housing in most instances. Such a safety cabinet is, for example, described in DE 44 41 784 C2 by the applicant. The operating unit comprises a series of switches, controllers or buttons that respectively serve for controlling a specific device function. For example, one switch serves for switching the safety cabinet on and off, another switch serves for switching the lights on and off, another switch serves for connecting and disconnecting the supply voltage to the power outlets, etc. Operating units of this type frequently are quite unmethodical and consequently difficult to operate. In addition, their manufacture is relatively expensive.

SUMMARY OF THE INVENTION

The present invention is based on the objective of disclosing a microbiological safety cabinet that simplifies the operation for the user and can be easily and inexpensively manufactured.

This objective is attained with the safety cabinet according to claim 1. Preferred embodiments and additional developments of the safety cabinet are disclosed in the dependent claims.

The invention discloses a safety cabinet with an interior that is enclosed by a housing and a housing front side with a work opening that can be closed with a height-adjustable front window. The safety cabinet comprises an operating unit that is integrated into the housing and serves for controlling device functions, wherein said operating unit comprises at least one rocker button, the button assignment of which changes depending on the operating state of the safety cabinet in such a way that a certain device function can be controlled in the respective operating state by actuating one button of the rocker button. The operating unit preferably comprises only one rocker button, in particular, a rocker button with a one-way or two-way rocker. Four-way rockers or other types of rocker buttons could also be utilized.

Rocker buttons of this type are generally known from the state of the art. They are sometimes also referred to as "pilot switches." In the context of the invention, a rocker button with a one-way rocker refers to a rocker button that can only be actuated in one direction. Such a rocker button usually comprises a rocker button that protrudes slantingly downward and switches the rocker button to "on" when pressed and jumps back to "off" when released. Two-way rockers, in contrast, can be actuated in two directions—upward and downward. In this case, the button assignment and the functions controlled by actuating either the upper or the lower button may vary. The question whether the assignment of the upper and the lower button of a two-way rocker (or the different buttons of a multiple-way rocker) differ from one another may, according to the invention, can also vary in dependence on the current operating state of the safety cabinet.

The utilization of the rocker button in accordance with the invention makes it possible to reduce the number of buttons or switches to be operated by the operator to a minimum. This significantly simplifies the operation of the operating unit according to the invention and faulty operations are practically precluded. The most important processes in the current operating state can be rapidly and specifically controlled because the button assignment is predetermined by the safety cabinet and depends on which functions need to be controlled in the current operating state of the safety cabinet.

It is, in principle, possible to control all operating functions of a safety cabinet by means of one or more rocker buttons. However, a few of the operating functions may also be assigned to conventional operating elements. In this case, it is preferred that the functions required for the safe operation of the cabinet be controlled by the rocker button(s) in order to ensure rapid and safe operation of the safety cabinet according to the invention. Less important functions that can still be controlled with conventional operating elements such as switches or controllers consist, in particular, of functions that are only required or changed occasionally, for example, the time of day, the timer, etc.

As mentioned above, the button assignment of the at least one rocker button is predetermined and depends on the respective operating state of the safety cabinet. The current operating state of the safety cabinet can be determined with conventional control and feedback devices that usually are already provided in a safety cabinet anyhow. These devices transmit information on, for example, whether the cabinet is switched on or off, whether the lights, the ventilation and the power outlets of the device are switched on or off, whether a malfunction has been detected or not, etc., to a control unit integrated into the device. It is practical to utilize a control program that defines which button assignment the at least one rocker button should have for a certain operating state, wherein said control program is also stored in the control unit of the safety cabinet and integrated into the control software of the safety cabinet.

The safety cabinet according to the invention is described in greater detail below with the example of an operating element that comprises only one rocker button with a one-way or two-way rocker, without limiting the invention to these embodiments. For example, two rocker buttons with a one-way rocker could be utilized instead of one rocker button with a two-way rocker. If not mentioned otherwise, the upper and the lower buttons of the two-way rocker have the same button assignment.

The operating state in which the operator usually encounters the safety cabinet before work begins is the operating state "safety cabinet switched off." The button assignment of the rocker button is preferably chosen such that an actuation of the rocker button causes the safety cabinet to be switched on and thusly changed over into a different operating state. The change in the operating state also causes a change in the button assignment of the rocker button, namely in accordance with specifications contained in the control software.

In order to simplify the operation of the safety cabinet, other functions may be triggered when switching on the safety cabinet. For example, at least one of the following processes is carried out when the safety cabinet is switched on: switching on the ventilation, switching on the lights, switching on the supply voltage for the integrated power outlets and displacing the height-adjustable front window into the working position. This makes it possible to change the safety cabinet according to the invention over into the normal operating state by actuating the rocker button.

Alternatively, it would also be conceivable to at least partially carry out the above-mentioned processes manually, preferably by actuating the rocker button. Each actuation causes the safety cabinet to be changed over into a new operating state, wherein the button assignment also changes. After switching on the safety cabinet, a button assignment for controlling at least one of the following processes can be realized in an arbitrary sequence by actuating the rocker button: switching on the ventilation, switching on the lights, switching on the supply voltage for the integrated power outlets and displacing the height-adjustable front window into the working position. Each pressing of the button may also trigger several processes simultaneously. After the safety cabinet has been manually "started up," it is in the normal operating state, in which the rocker button(s) has/have a specific button assignment.

The button assignment in the operative state of the safety cabinet is preferably chosen such that the displacement of the height-adjustable front window is controlled by actuating the rocker button. This is the function required most frequently during the normal operation of the safety cabinet. If only one rocker button with a one-way rocker is used, the displacement of the front window may be controlled in such a way that the window either moves upward or downward depending on its instantaneous position. For example, if the front window is in a largely opened state, it is preferably displaced downward first. Once the window arrives in the closed position, the moving direction is reversed such that the window is displaced upward. The button assignment may be programmed in such a way that the window is either displaced until the rocker button is pressed anew or the window is only displaced as long as the button is pressed.

When using a rocker button with a two-way rocker, the moving direction may vary in accordance with the respective button. In this case, an actuation of the upper button preferably causes an upward displacement of the front window while an actuation of the lower rocker button causes the window to be displaced downward.

If a defect is detected during the operation of the safety cabinet and/or an alarm is triggered, the safety cabinet is preferably changed over into a new operating state. In this defective state, the button assignment is also changed, preferably in such a way that a defect message or an alarm is respectively acknowledged when the rocker button is actuated.

In order to change over the safety cabinet from the normal operating state into the state "device switched off," the button assignment in the operative state of the safety cabinet is preferably chosen such that the safety cabinet is switched off if the operator continues to press the rocker button after the front window has been displaced into a completely opened or completely closed position. For example, if a rocker button with a two-way rocker is provided, the lower rocker button is pressed downward until the front window is completely closed, wherein the safety cabinet is switched off if the operator continues to press the button. In order to reliably ascertain whether it is actually desired to switch off the safety cabinet or another function should be triggered, the it can be provided that the rocker button needs to remain pressed for a certain extended period of time in ordered to switch off the safety cabinet. This may also be the case when switching on the safety cabinet.

The rocker button(s) is/are preferably arranged at an easily accessible location of the safety cabinet and, for example, integrated into the front side of the housing and/or the interior. If rocker buttons are provided in the interior and on the outside of the housing, their button assignments are preferably identical although different button assignments could also be realized.

In order to ascertain which functions can be controlled by means of the rocker button at a given time, the safety cabinet preferably contains a display element that displays the current operating state of the safety cabinet and/or the respective button assignment of the rocker button. The display element is preferably situated in the immediate vicinity of the rocker button. The display element may also have other display functions and, for example, additionally display warning messages, the time of day, the date or the like. The display element may, in principle, correspond to those used on conventional safety cabinets and, for example, consist of a LCD or LED display.

The operation by means of rocker buttons is particularly suitable for being combined with a remote-control for controlling the device functions. The operating unit with the rocker button serves, for example, for controlling functions required for the operation of the safety cabinet, wherein less important functions can be shifted to the remote-control. Naturally, it could also be conceivable to control the functions required for the operation of the safety cabinet with the remote-control. In this case, it is practical that control signals transmitted by the rocker button have a higher priority than control signals transmitted by the remote control. This ensures that the safety cabinet is still operative if the remote-control malfunctions.

BRIEF DESCRIPTION OF THE DRAWINGS

The invention is described in greater detail below with reference to the figures. The figures schematically show:

FIG. 1 shows a safety cabinet 1 according to the invention which has an interior 3 that is enclosed by a housing 2. A work opening 5 in the front side 4 of the housing makes it possible to access the interior 3 and can be closed with a height-adjustable front window 6. The safety cabinet 1 corresponds, in principle, to a conventional safety cabinet, e.g., as described in DE 44 41 784 C2, and comprises a ventilation system that, in principle, also corresponds to the state of the art. However, the operation of the safety cabinet according to the invention differs from that of conventional cabinets.

According to the invention, a rocker button 7 arranged on the front side 4 of the housing serves for operating the safety cabinet 1. In this case, the rocker button 7 is realized in the form of a one-way rocker. The single rocker button is actuated by pressing the button downward such that a certain process is triggered which depends on the current operating state of the safety cabinet 1. The button assignment and/or operating state is/are displayed to the operator on a display 8.

DETAILED DESCRIPTION OF THE PREFERRED EMBODIMENT

Figure 1:
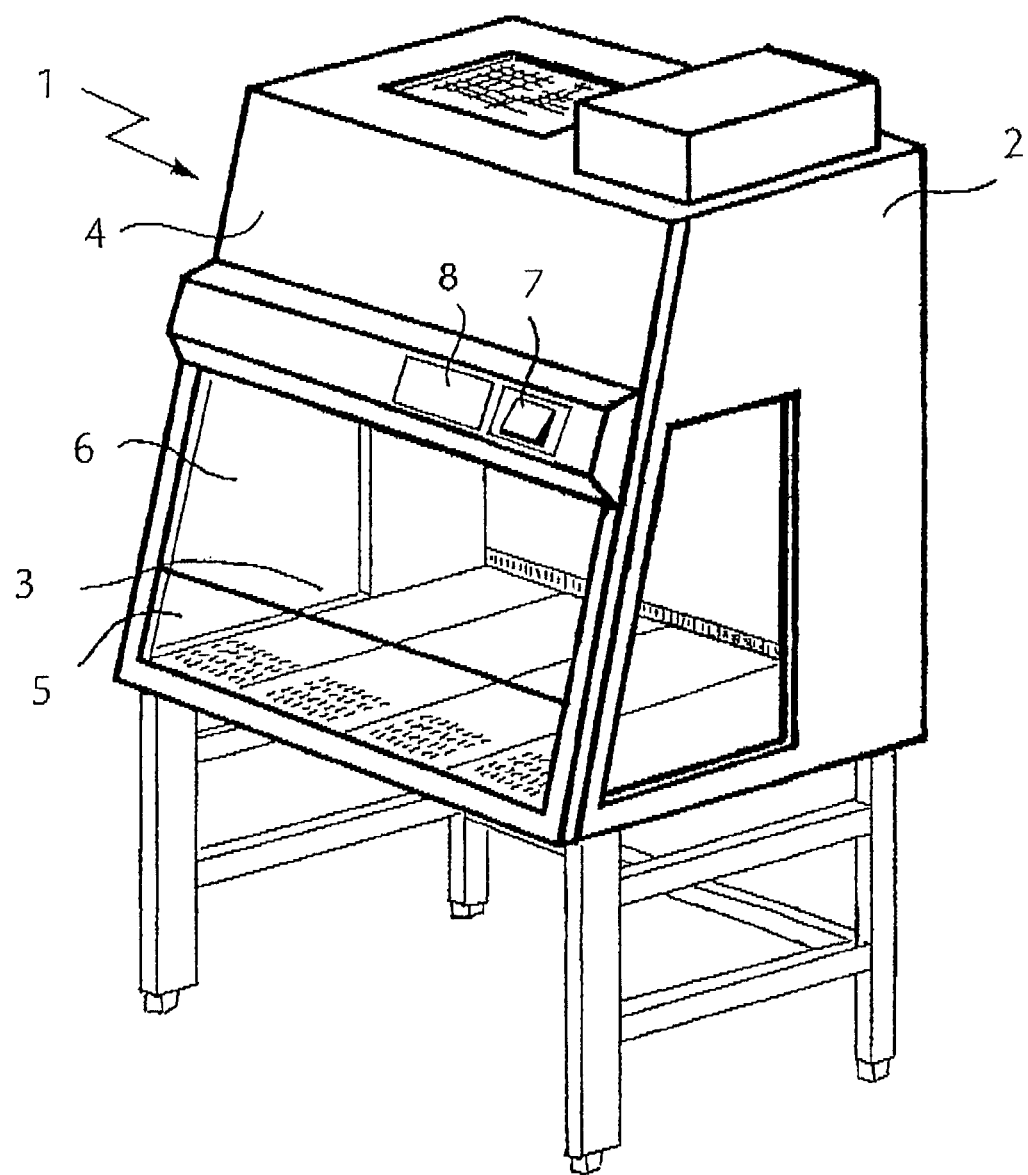
FIG. 1, a safety cabinet according to the invention in the form of a perspective representation.
Figure 2:
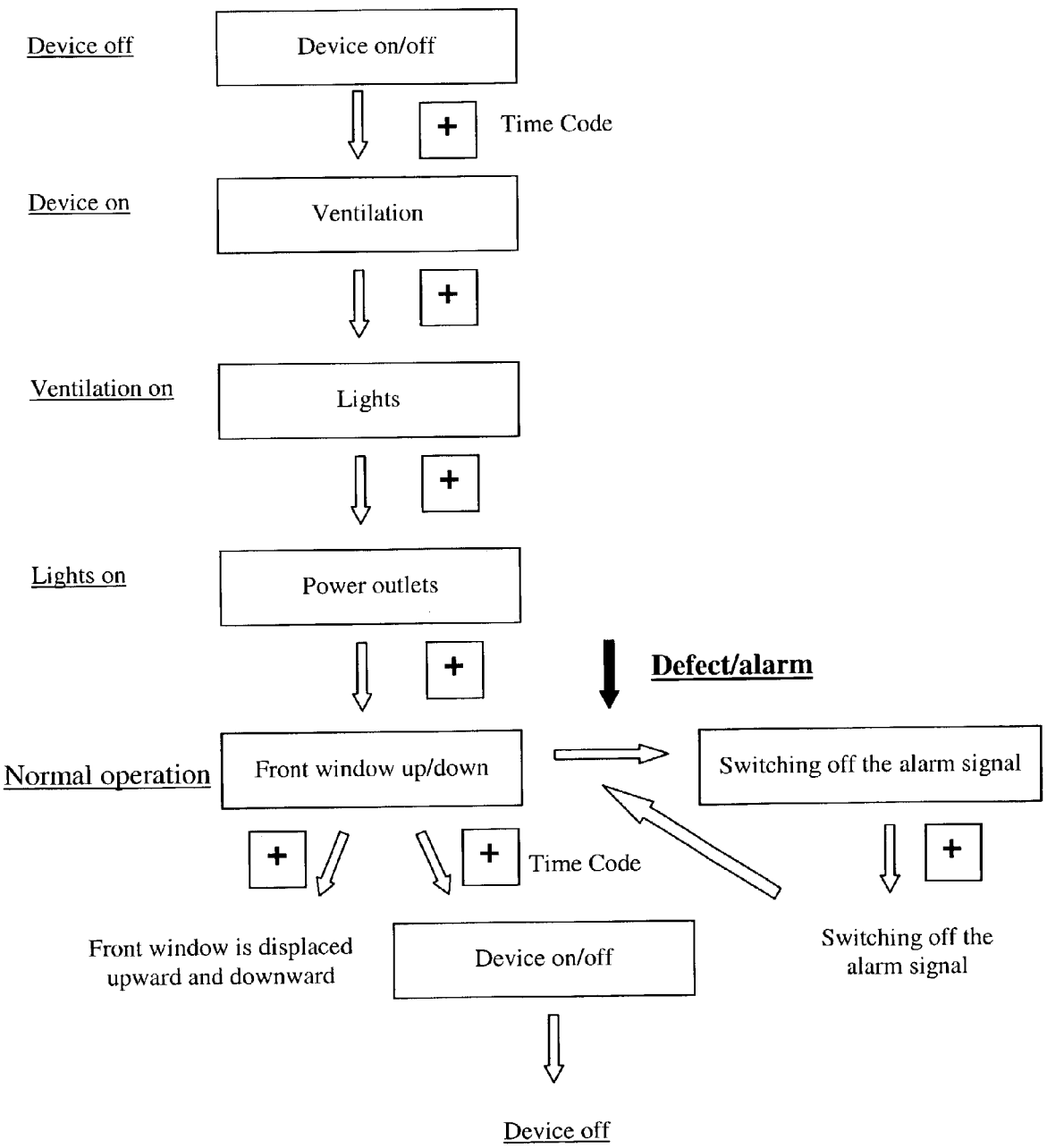
FIG. 2, a flow chart of one possible button assignment.

One possible button assignment that depends on the respective operating state of the safety cabinet 1 is schematically illustrated in FIG. 2. The respective operating state is underlined. The function controlled by actuating the rocker button 7 is indicated in the respective blocks. The actuation of the rocker button 7 is symbolized by the boxes containing a "+."

The safety cabinet 1 initially is switched off. The lights and the ventilation are not running, the (not-shown) power outlets of the safety cabinet 1 are not connected to the power supply, and the alarm monitoring is deactivated. The display 8 either displays no message at all or "OFF," the time of day or a similar messages for informing the operator that the safety cabinet is not operative.

When the rocker button 7 is actuated for an extended period of time ("time code"), the safety cabinet is initially switched on. Once the safety cabinet is switched on, the button assignment is changed such that the ventilation can now be switched on. In the "ventilation on" mode, the lights are switched on when the rocker button 7 is actuated. Once the safety cabinet is in this mode, the power outlets can be connected to the supply voltage by actuating the rocker button 7. The safety cabinet 1 is now in the normal operating state.

If a rocker button with a (not-shown) two-way rocker is used, the same switching sequence may be realized, wherein the upper and the lower button trigger the same function. However, it would also be conceivable to assign the upper button in such a way that, for example, when the operating menu point is reached it is skipped. However, such a skip is only possible if the function to be controlled is not essential for the safe operation of the safety cabinet 1—such as the connection of the power outlets to the supply voltage.

In the normal operating mode of the safety cabinet 1, the rocker button 7 serves for displacing the front window 6 upward and downward. When using the one-way rocker shown, the movement of the front window may be controlled in such a way that the window either moves upward or downward depending on its instantaneous position. For example, if the front window is in a largely opened state, it is preferably displaced downward first. Once the window has arrived in the closed position, the moving direction is reversed such that the window is displaced upward. However, it would also be conceivable to always displace the front window either upward or downward at the beginning. A change in the moving direction is initiated when the "extreme positions are reached." The button assignment may be programmed in such a way that the window is either displaced until the rocker button is pressed anew or the window is only displaced as long as the button is pressed.

If a defect is detected during the operation of the safety cabinet, the control unit also outputs an alarm message (for example, in the form of a displayed message and/or an acoustical alarm), and the operating state of the safety cabinet 1 changes. The safety cabinet 1 is now in a defective state. This means that the button assignment also changes. It is now no longer possible to move the front window 6 with the rocker button 7. The defect message or the alarm initially needs to be acknowledged by actuating the rocker button before the safety cabinet 1 returns into the normal operating state. This also causes the button assignment to change back to "front window up/down."

The safety cabinet can also be changed over from the normal operating state into the state "device off" by actuating the rocker button 7. This can be realized in different ways depending on the type of control of the front window by the rocker button 7.

For example, if the front window 6 is displaced by briefly pressing the rocker button and stopped by pressing the rocker button anew, the function "device off" can be differentiated from the command "front window up/down" based on the duration over which the button is pressed. An extended actuation of the rocker button 7 (time code) causes the safety cabinet 1 to be switched off.

Figure 3:
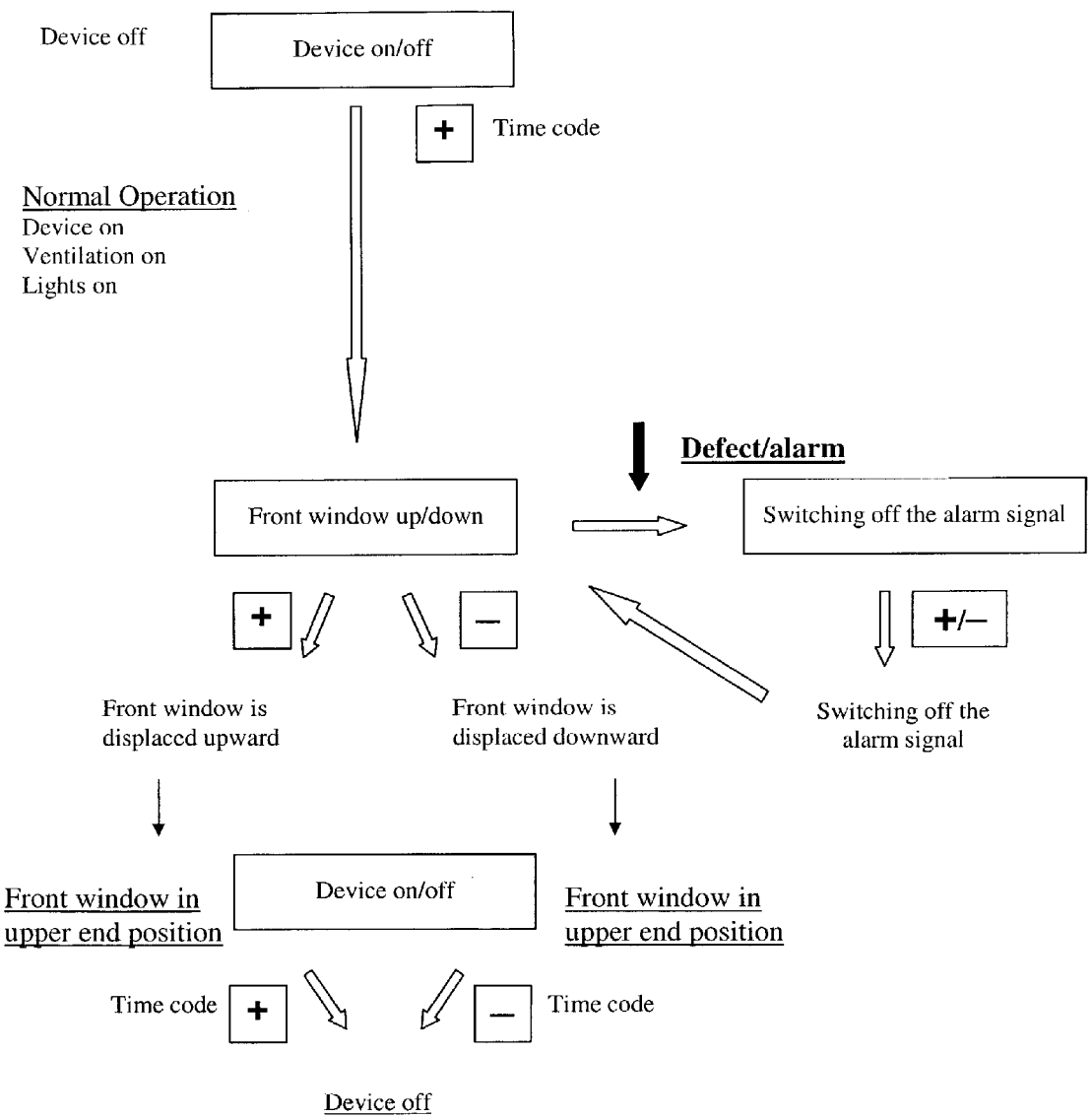
FIG. 3, a flow chart of another possible button assignment.

FIG. 3 shows a different switching scheme, in which a rocker button with a (not-shown) two-way rocker is used. The two-way rocker can be switched in two directions, namely upward (symbolized by "+") or downward ("−" in the boxes). If a box contains the symbol "+/−," this indicates that the upper and the lower button have the same assignment, i.e., that the same function is triggered by pressing the upper or the lower button. Otherwise, the reference symbols have the same meaning as described above with reference to FIG. 2.

In contrast to the switching scheme according to FIG. 2, an actuation of the rocker button 7 triggers several processes when the safety cabinet 1 is switched off. The safety cabinet is switched on, the ventilation and the lights are switched on, and the power outlets are connected to the supply voltage. This means that the safety cabinet 1 is changed over into the normal operating state by actuating the rocker button 7 only once. This simplified activation may also be realized with rocker buttons that have a one-way rocker.

As in the previously described instance, the rocker button 7 controls the height adjustment of the front window 6 in this normal operating state. In this state, the upper and the lower button of the rocker button 7 have a different assignment. The actuation of the upper button causes the front window to be displaced upward while the lower rocker button serves for displacing the window downward. The movement of the front window continues as long as the corresponding button is pressed. The different button assignments can be displayed to the user on the display element 8. In addition, other device parameters or information may be displayed, for example, the position of the front window, the adjustment of the ventilation or the like.

Defects are handled in the same fashion as described above with reference to FIG. 2.

The safety cabinet 1 can be switched off with either the upper or the lower button of the rocker button 7. The safety cabinet can only be switched off when the front window 6 is either completely closed or completely opened. The safety cabinet is switched off if the operator continues to actuate the rocker button after the front window has been displaced into a completely opened or completely closed position. When using a two-way rocker, the lower button is, for example, pressed downward until the front window is completely closed. If the operator continues to press the button, the safety cabinet is ultimately switched off. An unintentional deactivation the safety cabinet is reliably prevented due to the time code programming, according to which the rocker button needs to remain pressed for an extended period of time in order to switch off the safety cabinet.

What is claimed is:

1. A safety cabinet comprising:
   an interior enclosed by a housing, the interior comprising a housing front side
   a work opening disposed on the housing front side;
   a height-adjustable front window, that is configured to permit access to the work opening; and
   an operating unit integrated into the housing for controlling the safety cabinet functions, wherein the operating unit comprises a rocker button, wherein an operability function of the rocker button dynamically adjusts to control safety cabinet functions in response to a specific operating state, wherein the operability function for the operating state is predetermined.

2. The safety cabinet according to claim 1, wherein the rocker button, comprises a one-way rocker or a two-way rocker.

3. The safety cabinet according to claim 1, further comprising a control program that is integrated into a control software of the safety cabinet in order to adjust the button assignment.

4. The safety cabinet according to claim 1, wherein the button assignment of the rocker button in the operating state safety cabinet switched off is chosen such that an actuation of the rocker button switches on the safety cabinet and changes the safety cabinet over into a different operating state.

5. The safety cabinet according to claim 1, wherein one of the following processes is activated in response to the activation of the safety cabinet:
   switching on the ventilation
   switching on the lights
   connecting the integrated power outlets to the supply voltage displacing the height-adjustable front window into the working position.

6. The safety cabinet according to claim 1, wherein, after switching on the safety cabinet, the button assignment is changed such that at least one of the following processes can be carried out in an arbitrary sequence by actuating the rocker button:
   switching on the ventilation
   switching on the lights
   connecting the integrated power outlets to the supply voltage
   displacing the height-adjustable front window into the working.

7. The safety cabinet according to claim 1, wherein the button assignment in the operative state of the safety cabinet is chosen such that the displacement of the height-adjustable front window is controlled by actuating the rocker button.

8. The safety cabinet according to claim 7, wherein the button assignment in the operative state of the safety cabinet is chosen such that the safety cabinet is switched off if the operator continues to actuate the rocker button after the front window has been displaced into a completely opened or completely closed position.

9. The safety cabinet according to claim 1, wherein when a defect is detected and/or an alarm is triggered, the button assignment is changed in such a way that the defect message or the alarm is acknowledged when the rocker button is actuated.

10. The safety cabinet according to claim 1, wherein the rocker button needs to be actuated for a predetermined duration in order to switch the safety cabinet on and/or off.

11. The safety cabinet according to claim 1, wherein the rocker button is integrated into the front side of the housing and/or into the interior.

12. The safety cabinet according to claim 1, wherein the safety cabinet contains a display element that displays the current operating state of the safety cabinet and/or the respective button assignment of the rocker.

13. The safety cabinet according to claim 1, further comprising a remote-control for controlling the device functions.

* * * * *